United States Patent [19]
Raj et al.

[11] Patent Number: 6,153,927
[45] Date of Patent: Nov. 28, 2000

[54] PACKAGED INTEGRATED PROCESSOR AND SPATIAL LIGHT MODULATOR

[75] Inventors: Kannan Raj, Chandler; Ronald D. Smith, Phoenix, both of Ariz.

[73] Assignee: Intel Corporation, Santa Clara, Calif.

[21] Appl. No.: 09/409,218

[22] Filed: Sep. 30, 1999

[51] Int. Cl.[7] .......................... H01L 23/02; H01L 23/04; H01L 23/34; H01L 23/48; H01L 23/52

[52] U.S. Cl. ...................... 257/680; 257/698; 257/724; 257/738

[58] Field of Search ................................ 257/678, 680, 257/698, 724, 737, 738

[56] References Cited

U.S. PATENT DOCUMENTS

| | | | |
|---|---|---|---|
| 5,851,605 | 12/1998 | Hisamitsu et al. | 428/1 |
| 6,069,674 | 5/2000 | Aomori et al. | 349/12 |
| 6,075,580 | 6/2000 | Kouchi | 349/110 |

*Primary Examiner*—Ngân V. Ngô
*Attorney, Agent, or Firm*—Trop, Pruner & Hu, P.C.

[57] ABSTRACT

An integrated circuit die may have a processor and a spatial light modulator formed in the same die. An opening may be provided in an interposer to allow light to reach the spatial light modulator. A plurality of bump bonds may space the interposer from the die region including the processor. Thus, a display may be formed in an integrated fashion with a processor.

19 Claims, 5 Drawing Sheets

PACKAGED INTEGRATED PROCESSOR AND SPATIAL LIGHT MODULATOR

BACKGROUND

This invention relates generally to spatial light modulators that may be used, for example, for creating digital displays for electronic devices.

There is an increasing demand for relatively compact digital displays for a wide variety of electronic devices. For example, cellular telephones and a variety of other appliances have a need for a relatively compact display and in some cases the entire device may be sufficiently compact to be handheld. These devices have processor-based systems for running a variety of applications as well as the display. Conventionally a printed circuit board is utilized to organize a variety of integrated circuit chips to implement the processor and the circuitry for the spatial light modulator. This tends to spread the size of the device laterally increasing the minimum possible device size.

A number of emerging display technologies make it possible to provide relatively compact displays. For example, reflective light valves may be based on liquid crystal on silicon (LCOS) technology to merge mature silicon technology with liquid crystal optics technology. Micro displays as are used in handheld mobile phones and rear projection displays for personal computers and home entertainment are applications of hybrid reflective light modulator technology. In addition, grating light valves from Silicon Light Machine and the digital micro-mirror devices (DMMD) from Texas Instruments may also be used to create displays.

A spatial light modulator modulates the optical properties of a medium to allow an image to be displayed when the medium is exposed to light. The nature of the spatial light modulator is essentially inconsistent with the nature of the microprocessor. The microprocessor is an entirely silicon device which may be formed of a die and packaged with a variety of different contacts for connecting to the outside world. The spatial light modulator involves the use of a liquid crystal layer which is confined between a pair of spaced plates. Conventionally, the requirements for packaging liquid crystal based devices and microprocessors have been considered to be substantially different.

Thus, there is a continuing need for ways to better integrate microprocessors and spatial light modulators to achieve processor-based systems with more compact display arrangements.

SUMMARY

In accordance with one aspect, a packaged integrated circuit device includes a die having a processor and image processing circuitry formed thereon. A liquid crystal layer is positioned over the image processing circuitry. An interposer is bump bonded to the die. The interposer is arranged to allow light to reach the liquid crystal layer.

Other aspects are set forth in the accompanying detailed description and claims.

DETAILED DESCRIPTION

Figure 1:
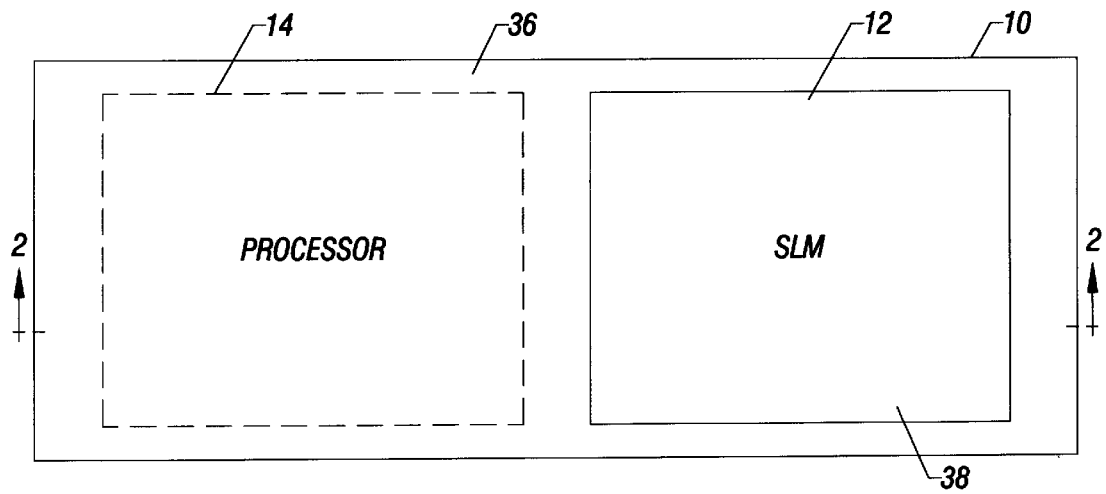
FIG. 1 is an enlarged top plan view of one embodiment of the present invention.
Figure 2:
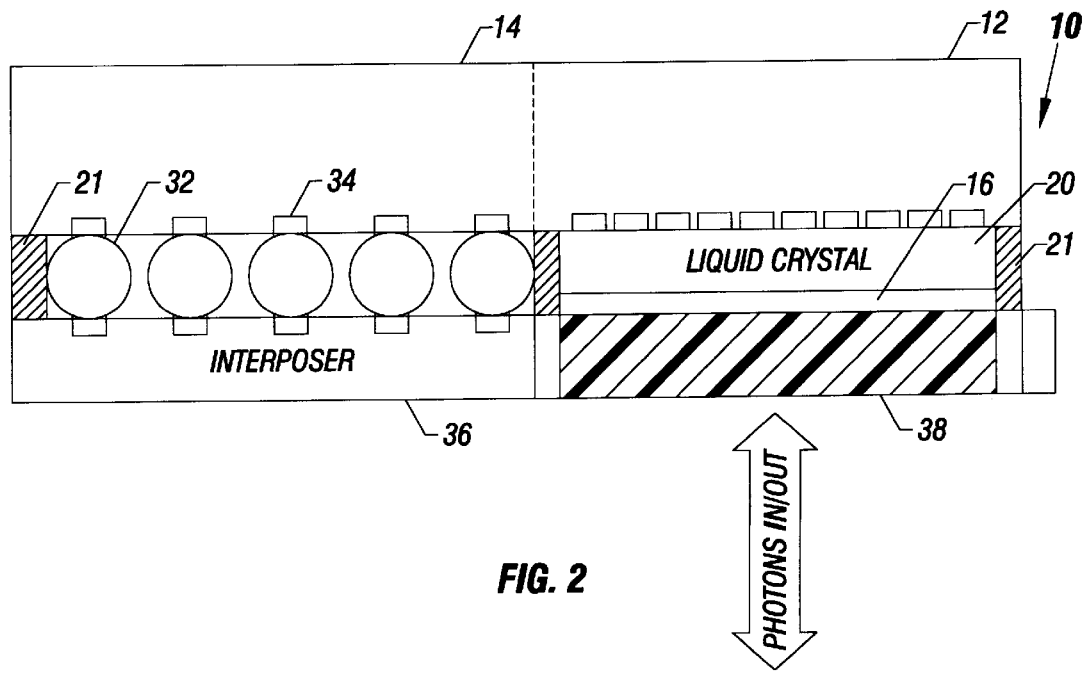
FIG. 2 is a cross-sectional view of the embodiment shown in FIG. 1 taken generally along the line 2—2 in FIG. 1.

A silicon die 10, shown in FIGS. 1 and 2, may include a processor region 14 which includes a microprocessor integrated into the silicon die 10. In addition, the die 10 may have formed thereon one or more of an L2 cache, a graphics controller, a frame buffer and a display controller, in one embodiment of the present invention.

Beside the processor region 14 in the die 10 is a spatial light modulator region 12. The spatial light modulator region 12 may include a spatial light modulator array which may include elements for creating each of the primary color planes such as the red, green and blue color planes. The color planes may be produced by a time sequential series of pulses, one sequential pulse for each color plane. Alternatively, the color planes may be produced by three or four parallel channels. The fourth channel may be a luminosity channel. The modulator then simultaneously generates the three color planes from the parallel channels.

The region 12 may also include pixel plane processing circuitry for the display of information by the spatial light modulator 12. In addition, in some embodiments of the present invention, an imaging sensor array and associated focal plane processing circuitry may be provided to implement a camera. Thus, the die 10 may be divided into the processor region 14 containing processor-based circuitry which does not need light exposure and a spatial light modulator region 12 which works with exposure to external light.

Referring to FIG. 2, the region 14 may be coupled by bonding pads 34 to bumps 32. The bumps 32 may be conventional solder balls which are utilized in microelectronic packaging, variously called flip chip packaging, bump bonding and surface mount packaging. The bumps 32 may be surface mounted to an interposer 36. The interposer 36 includes electrical interconnections for connecting the die 10 to external circuitry. In addition, the interposer 36 may have an optically transparent window 38 formed over the region 12.

Thus, the interposer 36 may enable connections with external input/output devices such as an external keyboard or keypad to allow the user to provide input commands to the processor region 14. The processor's output information may be displayed on a display associated with the spatial light modulator 12.

Between the die 10 and the window 38, a liquid crystal element 20 is located underneath an indium tin oxide coated top plate 16. The liquid crystal element 20 may be implemented as a separate liquid crystal display element in one embodiment of the present invention. However, it is advantageous to implement the liquid crystal element 20 using a liquid crystal over semiconductor (LCOS) technology.

A spacer 21 maintains the separation between the substrate 10 and the interposer 36. The spacer 21 may provide standoffs for maintaining the separation for the liquid crystal element 20. The spacer 21 may also provide a sealing function to retain the liquid crystal material. The spacer 21 may be in a figure eight configuration to balance any forces that would tend to draw the interposer 36 toward one or the other of the regions 12 and 14.

Figure 3:
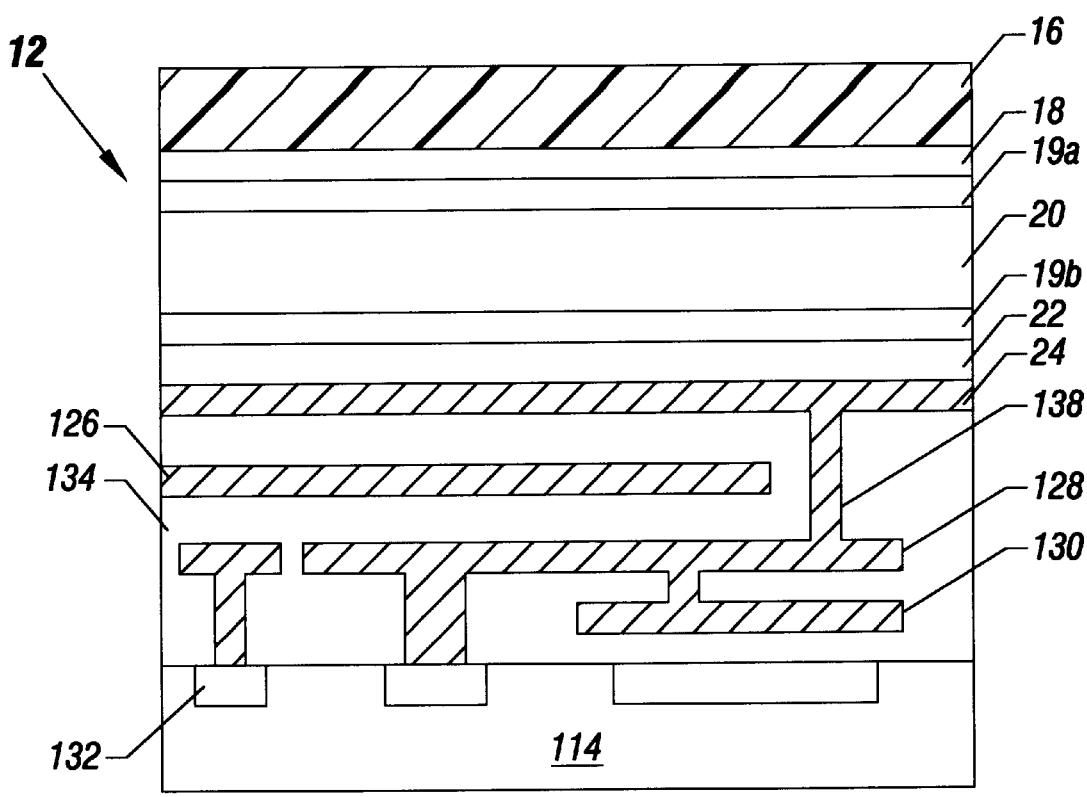
FIG. 3 is a greatly enlarged cross-sectional view through the spatial light modulator shown on the right side in FIG. 2.

Referring to FIG. 3, a spatial light modulator 12 may include a plurality of reflective mirrors defined on a semiconductor substrate 14 in accordance with one embodiment of the present invention. With LCOS technology, the liquid crystal display is formed in association with the same substrate that forms complementary metal oxide semiconductor (CMOS) circuit elements. The display may be a reflective liquid crystal display in one embodiment of the present invention.

A silicon substrate 114 may have a metal layer defining the mirrors for the spatial light modulator. Potentials supplied to the mirrors alter the liquid crystal to modulate the incoming light to create images. These images can be directly viewed or projected onto a projection screen.

Each cell or pixel of the display may include a reflective mirror 24 forming one of the mirrors of one of the pixels of the overall display. In one embodiment of the invention, each cell may be rectangular or square. Thus, a rectangular array of mirrors 24 may form an array of pixel elements in conjunction with liquid crystal element 20 positioned over the mirrors 24.

The LCOS structure includes a silicon substrate 114 having doped regions 132 formed therein. The doped regions 132 may define transistors for logic elements and/or memory cells which operate in conjunction with the display pixels. In one embodiment of the invention, four or more metal layers may be provided, including a metal one layer 130 which is spaced by an inter-layer dielectric (ILD) 134 from the metal two layer 128 and metal three layer 126. A metal four layer may form the pixel mirrors 24. Thus, for example, the metal two layer 128 may provide light blocking and the metal one layer 130 may provide the desired interconnections for forming the semiconductor logic and memory devices. The pixel mirrors 24 may be coupled, by way of vias 138, with the other metal layers.

A dielectric layer 22 may be formed over the mirror 24. A liquid crystal or electro-optic element 20 is sandwiched between a pair of buffered polyimide layers 19a and 19b. One electrode of the liquid crystal device is formed by the mirror 24. The other electrode is formed by an indium tin oxide (ITO) layer 18.

The top plate 16 may be formed of transparent material. The ITO layer 18 may be coated on the top plate 16. The polyimide layers 19a and 19b provide electrical isolation between the capacitor plates which sandwich the electro-optic material 20. However, other insulating materials may coated on the ITO layer 18 in place of or in addition to the polyimide layers 19.

Figure 4:
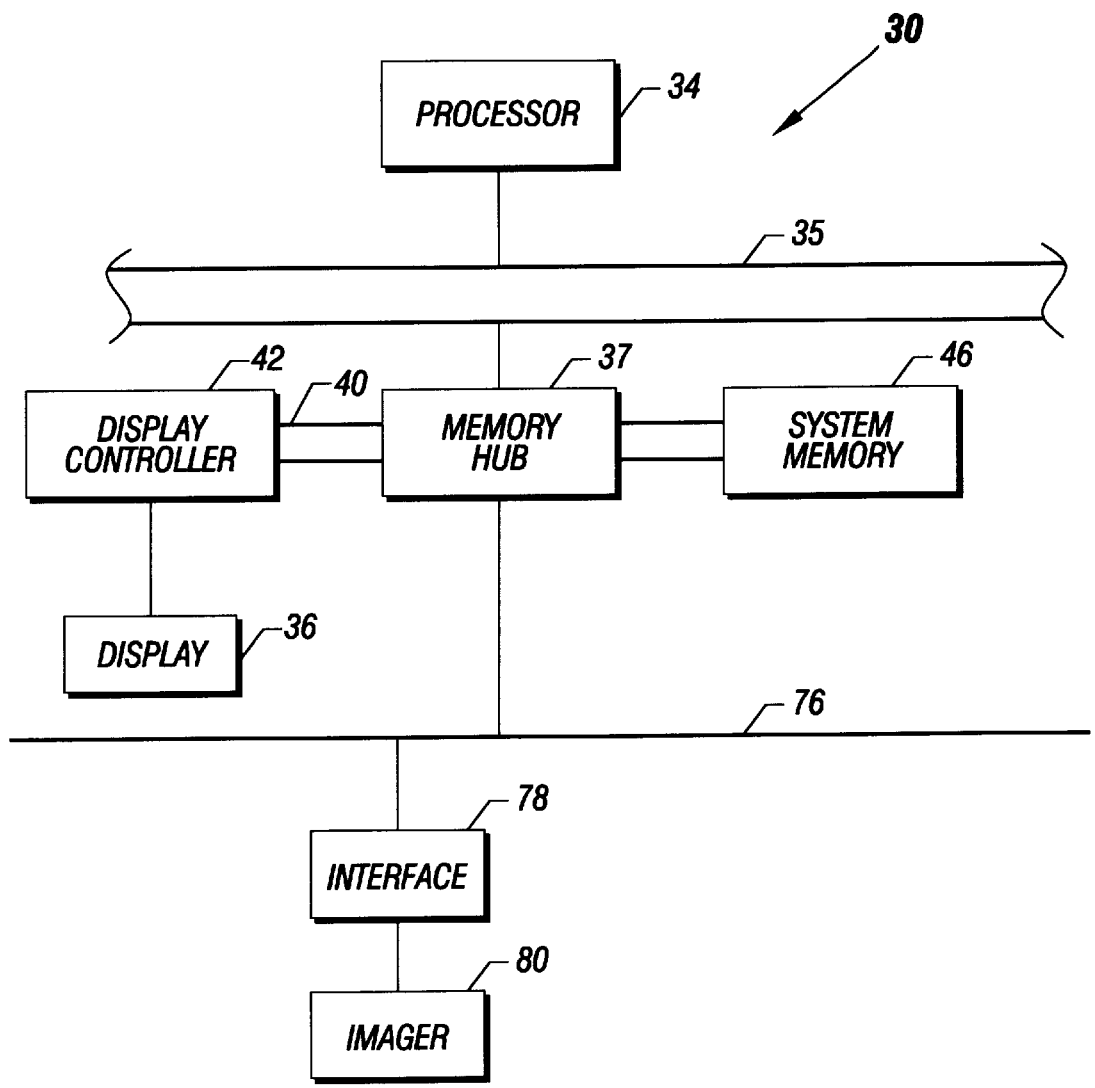
FIG. 4 is a block diagram showing one implementation of the embodiment shown in FIG. 2.

Referring now to FIG. 4, a typical portable computer system 30 such as a laptop or handheld computer system, as examples, may include a liquid crystal display 36 to generate images for the computer system 30. In this manner, a processor (a central processing unit) (CPU for example), may store image data (in a system memory 46) that indicate intensity values for the images to be displayed on the display 36. The image data may be temporarily stored in a frame buffer in the display controller 42.

The processor 34 may be coupled to a memory hub 37 which may be implemented as a bridge or other interface by a host bus 35. The memory hub 37 may be coupled between the system memory 46, and the display controller 42 (via bus 40). In addition, the memory hub 37 may couple to a bus 76.

The bus 76 may be coupled through an interface 78 to an imager 80. Thus, the die 10 may integrate all of the components illustrated in FIG. 4 with the exception, in some embodiments, of the system memory 46.

Figure 5:
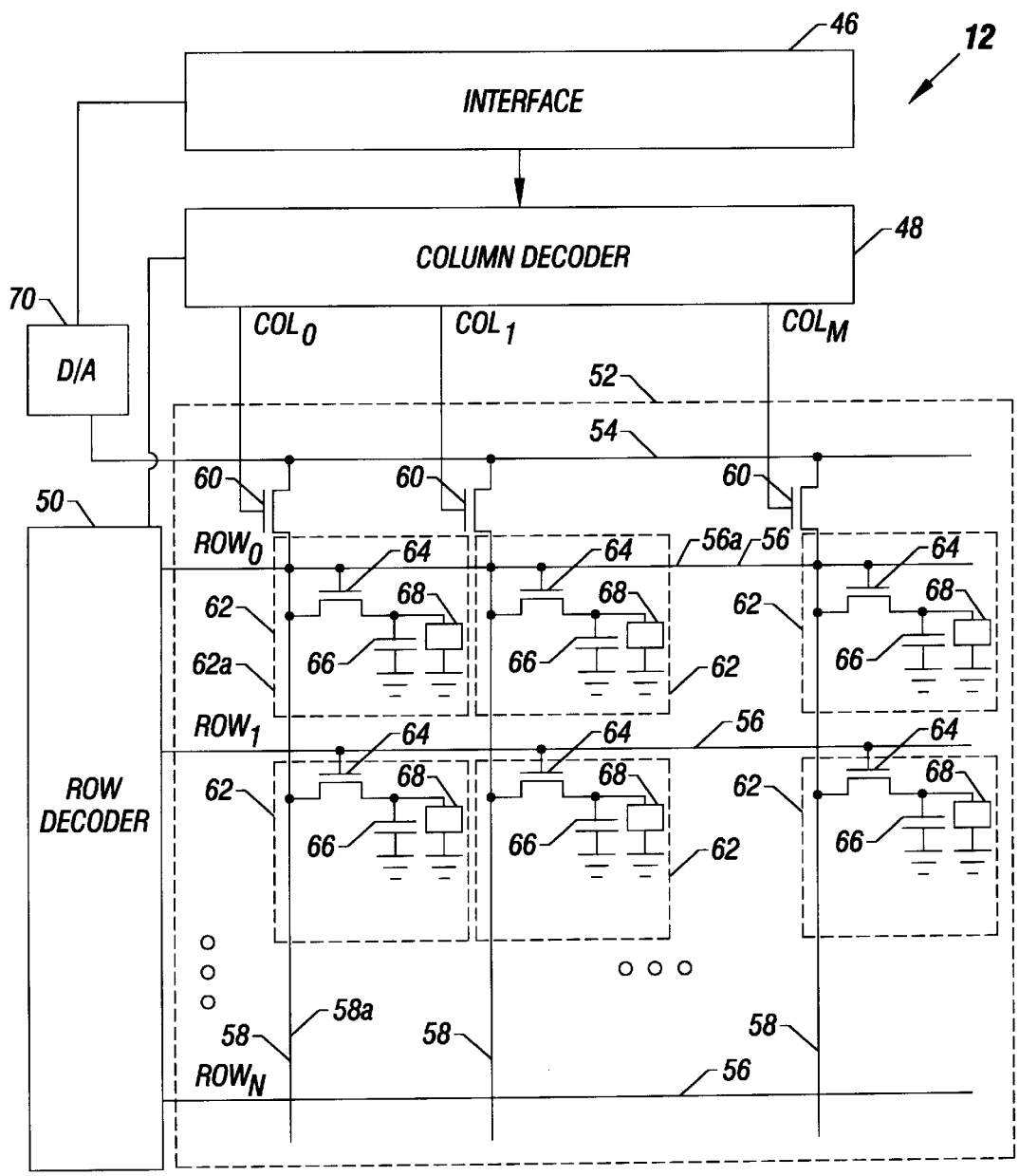
FIG. 5 is a more detailed block depiction of the imaging circuitry used in connection with one embodiment of the spatial light modulator.

Turning now to FIG. 5, as an example, the display 36 may be an active matrix liquid crystal display panel implemented by a spatial light modulator 12 that includes an array 52 of pixel cells 62 arranged in rows and columns that form corresponding pixels of an image. Each pixel cell 62 typically receives an electrical voltage that control optical properties of the cell 62 and thus controls perceived intensity in the corresponding pixel. If the cell 62 is a reflective pixel cell, the level of the voltage controls the amount of light that is reflected by the cell 62. If the cell is a transmissive pixel cell, the level of voltage controls the amount of light that is transmitted by the cell 62.

Updates are continually made to the voltages of the pixel cells 62 to refresh or update the displayed image. The charges that are stored by the display elements 62 typically are updated by a row 50 and column 48 decoders in a procedure called a raster scan. A raster scan is sequential in nature, the designation implies the display elements 62 are updated in a particular order such as from left to right and right to left.

During the scan, the selection of a particular display element 62 may include activating a particular row line 56 and a particular column line 58 (row line 56a as an example), and the columns of the display element 62 are associated with column lines 58 such as the column line 58a as an example. Thus, each selected row line and column line pair uniquely addresses or selects the display element 62 for purposes of transferring a charge in the form of a voltage to a capacitor 66 that stores the charge of the selected display element 62.

As an example, for the display element 62a (located at pixel position 0,0), a voltage may be applied to the video signal input line 54 by a digital-to-analog converter 70 at the appropriate time that indicates a new charge that is to be stored in the display element 62a. To transfer this voltage to the display element 62a, the row decoder 50 may assert to drive high for example a row select signal called $ROW_0$ on a row line 56a that is associated with the display element 62a while the column decoder 50 is asserting a column signal called $COL_0$ on column line 58a that is also associated with the display element 62a. In this manner, the assertion of the row signal may cause a transistor 64 to couple a capacitor 66 to the column line 58a. Assertion of the column signal may cause the transistor 60 to couple the video input signal line 54 to the column line 58a. As a result of these connections, a charge indicated by the voltage of the video signal line is transferred to the capacitor 66 of the display element 62a. The other display elements may be selected for charge updates in a similar manner.

Figure 6:
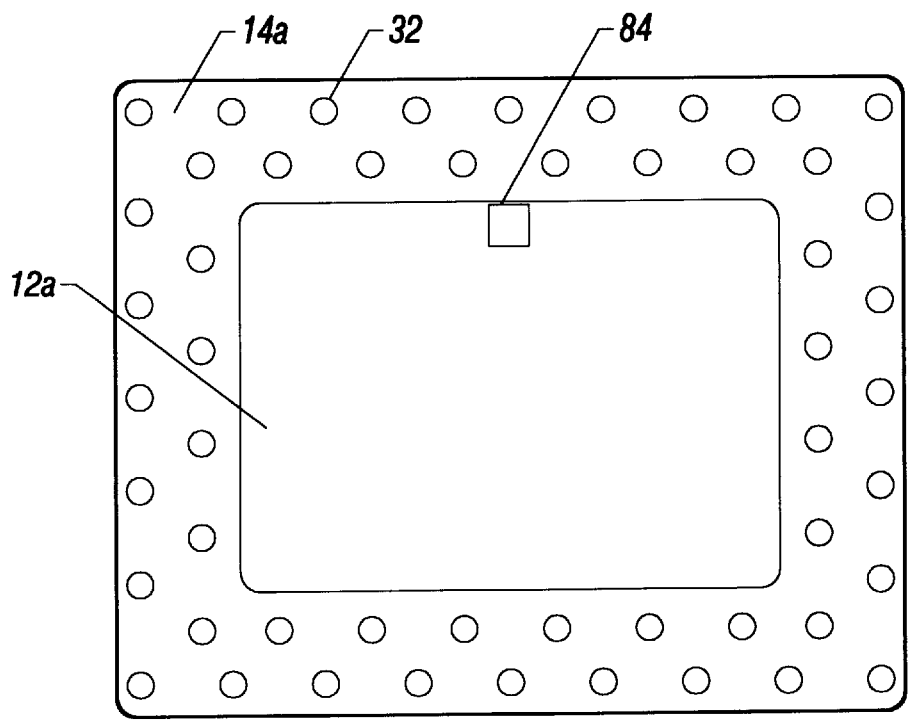
FIG. 6 is a top plan view of another embodiment of the present invention.

In accordance with still another embodiment of the present invention, a die 10a, shown in FIG. 6, may include a bonding region 14a, around the peripheral edges of the die, which may be covered by bumps 32. In general, the processor related components may be laid out in the die 10a primarily under the peripheral bonding region 14a. The central region 12a may include image processing-based circuitry including an imaging array 84 and a spatial light modulator adapted to display three color planes. A display may be defined in the region 12 and an image sensor such as a CMOS sensor may be associated with the region 84.

The arrangement shown in FIG. 6 with the solder balls 32 distributed around the regions 12 and 14 may advantageously equalize the forces that may arise from solder ball surface tension. By distributing the solder balls 32 symmetrically about the device, the surface tension forces may be equalized.

Figure 7:
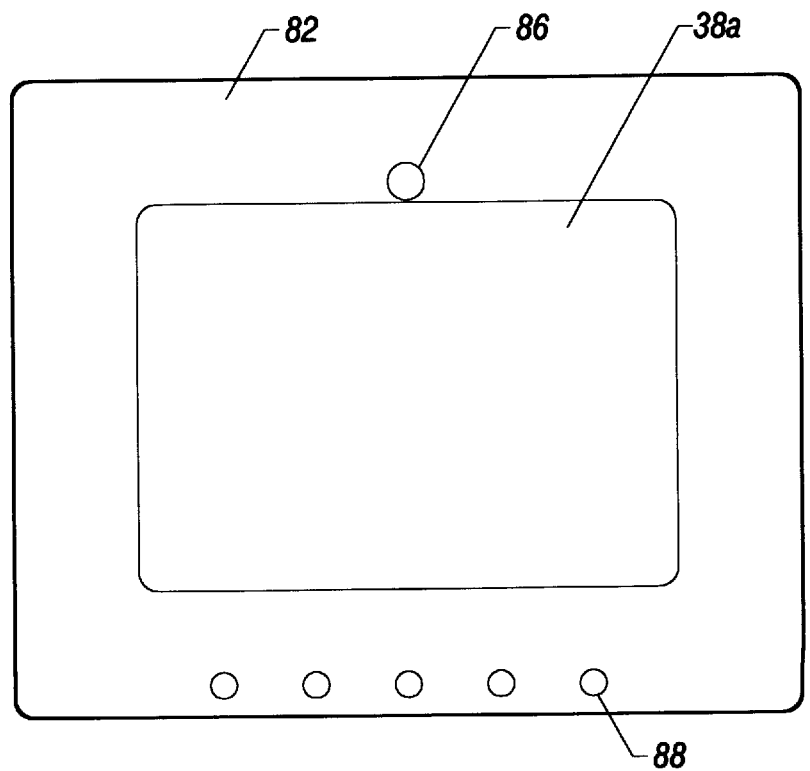
FIG. 7 is a top plan view of the device of FIG. 6 after it has been housed.

Thus, referring to FIG. 7, a housing 82 may enclose the region 14*a* (FIG. 6) and may expose, through an window 38*a*, the light sensitive areas 84 and 12*a*. A plurality of user input controls 88 may be provided externally on the housing 82 which may operate through an interposer, like the interposer 36, to enable the user to provide input commands to the circuitry 12*a*. In addition, a lens 86 may be provided to implement a camera function in association with the image sensor defined in the region 84 (FIG. 6).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A packaged integrated circuit device comprising:
    a die having a processor and image processing circuit formed thereon;
    a liquid crystal layer is positioned over the image processing circuitry; and
    an interposer is bump bonded to said die, the interposer is arranged to allow light to reach the liquid crystal layer.

2. The device of claim 1 wherein said interposer includes a light transmissive window.

3. The device of claim 1 wherein said image processing circuitry includes liquid crystal over semiconductor technology.

4. The device of claim 1 wherein said liquid crystal layer is situated over said die beneath said interposer and a plurality of bumps are positioned between said die and said interposer around said liquid crystal layer.

5. The device of claim 1 wherein said interposer is substantially planar.

6. The device of claim 1 wherein said interposer is bump bonded to a first side of said die.

7. The device of claim 6 wherein said processor is arranged on said first side of said die.

8. The device of claim 7 wherein said image processing circuitry is arranged on said first side of said die.

9. The device of claim 1 wherein said interposer is bump bonded peripherally to said die.

10. The device of claim 1 wherein said image processing circuitry includes a spatial light modulator.

11. The device of claim 10 wherein said die includes a digital image sensor.

12. The device of claim 1 wherein said image processing circuit handles color planes sequentially.

13. The device of claim 1 wherein said processing circuit handles color planes in parallel.

14. A processor-based system comprising:
    a die having a processor and a spatial light modulator formed thereon;
    an interposer bump bonded to said die over said processor, said interposer arranged to allow light to access said spatial light modulator; and
    a storage device coupled to said die.

15. The system of claim 14 wherein said processor and said spatial light modulator are formed on two opposed sides of said die.

16. The system of claim 14 wherein said interposer is bump bonded to said die around the periphery of said die, said spatial light modulator is positioned centrally on said die and an opening is formed through said interposer to enable light to reach said modulator.

17. The system of claim 14 wherein said die includes a digital image sensor.

18. The system of claim 14 wherein said modulator produces color planes sequentially.

19. The system of claim 14 wherein said modulator produces color planes in parallel.

* * * * *